US011619171B2

(12) United States Patent
Castillo Campos et al.

(10) Patent No.: US 11,619,171 B2
(45) Date of Patent: *Apr. 4, 2023

(54) METHOD TO CONDITION AND CONTROL SUPERCRITICAL LIQUEFIED PETROLEUM GASES FUEL FLOW FOR OPERATION IN GAS TURBINES

(71) Applicant: General Electric Company, Schenectady, NY (US)

(72) Inventors: Jesus Daniel Castillo Campos, San Luis Potosi (MX); Joe F. Schornick, Pearland, TX (US); Jose Carlos Sanchez Herrera, El Marques (MX); Horacio Solis Godinez, Queretaro (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,732

(22) Filed: Sep. 9, 2022

(65) Prior Publication Data
US 2023/0003172 A1 Jan. 5, 2023

Related U.S. Application Data

(62) Division of application No. 16/936,982, filed on Jul. 23, 2020.

(51) Int. Cl.
*F02C 7/224* (2006.01)
*F02C 7/236* (2006.01)
(Continued)

(52) U.S. Cl.
CPC .............. *F02C 7/224* (2013.01); *F02C 7/236* (2013.01); *F02C 9/263* (2013.01); *F02C 9/28* (2013.01);
(Continued)

(58) Field of Classification Search
CPC ............ F02C 3/20; F02C 7/224; F02C 7/236; F02C 9/263; F02C 9/28; F02C 9/40
See application file for complete search history.

(56) References Cited

U.S. PATENT DOCUMENTS

| | | | |
|---|---|---|---|
| 2011/0225976 A1 | 9/2011 | Ziminsky et al. | |
| 2016/0025339 A1 | 1/2016 | Kamath et al. | |
| 2019/0218971 A1 | 7/2019 | Niergarth et al. | |
| 2022/0025817 A1 | 1/2022 | Castillo Campos et al. | |

FOREIGN PATENT DOCUMENTS

| CN | 203532056 U | 4/2014 |
|---|---|---|
| CN | 113969838 A | 1/2022 |

(Continued)

OTHER PUBLICATIONS

EP Search Report issued in connection with corresponding EP Application No. 21185176.1-1007, dated Dec. 17, 2021, 15 pages.
(Continued)

*Primary Examiner* — Scott J Walthour
(74) *Attorney, Agent, or Firm* — James Pemrick; Charlotte Wilson; Hoffman Warnick LLC

(57) ABSTRACT

A fuel conditioning and control system provides dynamic control and steady state operations of a gas turbine provided fueled by supercritical liquefied petroleum gas (LPG). The fuel conditioning and control system comprises a storage for LPG fuel; a fuel delivery sub-system connecting the storage to turbomachinery; and a control system. The gas turbine includes a gas turbine core control that provides at least one operational data of the gas turbine to the control system. The fuel delivery sub-system includes at least one sensor for sensing at least one property of the LPG fuel in the fuel delivery sub-system, where the at least one sensor providing data on the at least one property of the LPG fuel to the control system. The control system analyzes the data on the at least one property of the LPG fuel and at least one
(Continued)

operational data of the gas turbine for dynamic control of LPG fuel to the gas turbine under dynamic and steady state conditions.

8 Claims, 2 Drawing Sheets

(51) Int. Cl.
    *F02C 9/28*     (2006.01)
    *F02C 9/40*     (2006.01)
    *F02C 9/26*     (2006.01)

(52) U.S. Cl.
    CPC .......... *F02C 9/40* (2013.01); *F05D 2270/301* (2013.01); *F05D 2270/303* (2013.01); *F05D 2270/304* (2013.01); *F05D 2270/52* (2013.01); *F05D 2270/80* (2013.01)

(56) References Cited

FOREIGN PATENT DOCUMENTS

| | | |
|---|---|---|
| EP | 3943735 A1 | 1/2022 |
| JP | H11210492 A | 8/1999 |

OTHER PUBLICATIONS

U.S. Energy Information Administration, Glossary, "Liquefied petroleum gases (LPG)" https://www.eia.gov/tools/glossary/index.php?id=Liquefied%20petroleum%20gases%20%28LPG%29 ; earliest available publication Apr. 28, 2017, accessed May 20, 2022 (Year: 2017).

U.S. Energy Information Administration, "Natural Gas Explained", https://www.eia.gov/energyexplained/natural-gas/ ; earliest available publication Aug. 29, 2019, accessed May 20, 2022 (Year: 2019).

Vesovic, Velisa, "Methane", Thermopedia, https://www.thermopedia.com/content/951/ earliest available publication Jul. 13, 2013, accessed May 20, 2022 (Year: 2013).

Vesovic, Velisa, "n-Butane", Thermopedia, https://www.thermopedia.com/content/607/ earliest available publication Aug. 8, 2014, accessed May 20, 2022 (Year: 2014).

Vesovic, Velisa, "Propane", Thermopedia, https://www.thermopedia.com/content/1063/ earliest available date Mar. 2, 2017, accessed May 20, 2022 (Year: 2017).

Vesovic, Velisa, "Isa-Butane", Thermopedia, https://www.thermopedia.com/content/890/ earliest available date Nov. 29, 2011, accessed May 20, 2022 (Year: 2011).

"What's the Difference Between LPG and LNG" Petro Online, https://www.petro-online.com/news/analytical-instrumentation/11/breaking-news/whats-the-difference-between-lpg-and-lng/50495 , published Oct. 7, 2019, accessed May 20, 2022 (Year: 2019).

Li, Xunfeng, et al., "Study of turbulent heat transfer of aviation kerosene flows in a curved pipe at supercritical pressure", Applied Thermal Engineering, Sep. 2010, p. 1847 (Year: 2010).

Boretti, A. and Watson, H., Development of a Direct High Flexibility Cng/Lpg Spark Ignition Engine, SAE Technical Paper 2009-01-1969, 2009.

U.S. Appl. No. 16/936,982, Non-Final Office Action dated May 25, 2022, 10 pages.

U.S. Appl. No. 16/936,982, Notice of Allowance and Fees Due dated Aug. 18, 2022, 15 pages.

METHOD TO CONDITION AND CONTROL SUPERCRITICAL LIQUEFIED PETROLEUM GASES FUEL FLOW FOR OPERATION IN GAS TURBINES

This application is a Divisional Application of U.S. patent application Ser. No. 16/936,982 filed Jul. 23, 2020, the entire contents of which are fully incorporated herein.

BACKGROUND

The disclosure relates generally to fuel conditioning and control systems. More particularly, the disclosure relates to a fuel conditioning system, a fuel control system and method to operate gas turbines with Liquefied Petroleum Gas (LPG) fuels in supercritical phase.

BRIEF DESCRIPTION

An aspect of the disclosure provides a fuel conditioning and control system that provides dynamic control and steady state operations of a gas turbine provided by liquefied petroleum gas (LPG). The fuel conditioning and control system comprises a storage for LPG fuel; a fuel delivery sub-system connecting the storage to the gas turbine; and a control system. The gas turbine includes a gas turbine core control that provides at least one operational data of the gas turbine to the control system. The fuel delivery sub-system includes at least one sensor for sensing at least one property of the LPG fuel in the fuel delivery sub-system, where the at least one sensor provides data on the at least one property of the LPG fuel to the control system. The control system analyzes the data on the at least one property of the LPG fuel and at least one operational data of the gas turbine for control of LPG fuel flow to the gas turbine under dynamic and steady state conditions.

Another aspect of the disclosure provides a liquefied petroleum gas (LPG) fuel conditioning and delivery method. The method includes pumping liquid LPG fuel from a storage tank to a gas turbine in a fuel delivery sub-system; converting the liquid LPG fuel from liquid LPG fuel to supercritical LPG fuel; sensing at least one property of the LPG fuel in the fuel delivery sub-system, the sensing providing data on the at least one property of the LPG fuel to a control system; and controlling converting the liquid LPG fuel from liquid LPG fuel to supercritical LPG fuel by the control system in response to a fuel flow demand of the gas turbine for dynamic control and steady state operations of a gas turbine provided with supercritical LPG fuel.

Yet another aspect of the disclosure provides a fuel conditioning and control system for dynamic control and steady state operations of a gas turbine provided with liquefied petroleum gas (LPG). The fuel conditioning and control system is provided with a storage for LPG fuel; and a fuel delivery sub-system connecting the storage to gas turbine, where the fuel delivery system includes a vaporizer/heat exchanger. The vaporizer/heat exchanger has heat applied thereto to heat liquid LPG fuel delivered therein from the fuel delivery sub-system to convert the liquid LPG fuel to supercritical LPG fuel, wherein the heat applied thereto is based on a function of LPG fuel demand of the gas turbine. A control system including a programmable logic control (PLC) is provided. The fuel delivery sub-system further includes a liquid fuel metering valve (LFMV), the PLC and the LFMV are connected so the PLC can provide operating instructions to the LFMV for controlling flow of LPG fuel along the fuel delivery sub-system. The gas turbine includes a gas turbine core control that provides at least one operational data of the gas turbine to the control system. The fuel delivery sub-system includes at least one sensor for sensing at least one property of the LPG fuel in the fuel delivery sub-system, the at least one sensor providing data of the at least one property of the LPG fuel to the control system. The control system analyzes the data of the at least one property of the LPG fuel and at least one operational data of the gas turbine for dynamic control of LPG fuel flow to the gas turbine under dynamic and steady state conditions. The at least one sensor for sensing at least one property of the LPG fuel in the fuel delivery sub-system includes a plurality of pressure sensors, a plurality of temperature sensors, and LPG fuel properties instruments, such as a gas chromatograph and/or a gas calorimeter with chromatography capabilities including but not limited to a Wobbe Index Meter. Further, the fuel delivery sub-system includes a low-pressure pump and a high-pressure pump in series, the low-pressure pump and the high-pressure pump in series increasing pressure of the LPG fuel in the fuel delivery sub-system. The fuel delivery sub-system includes an electric motor speed variation device such as a variable frequency drive (VFD), or a switched reluctance (SR) motor, that is connected to at least the high-pressure pump. The PLC and the VFD/SR are connected so the PLC can provide operating instructions to the VFD/SR for controlling operations of at least the high-pressure pump.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
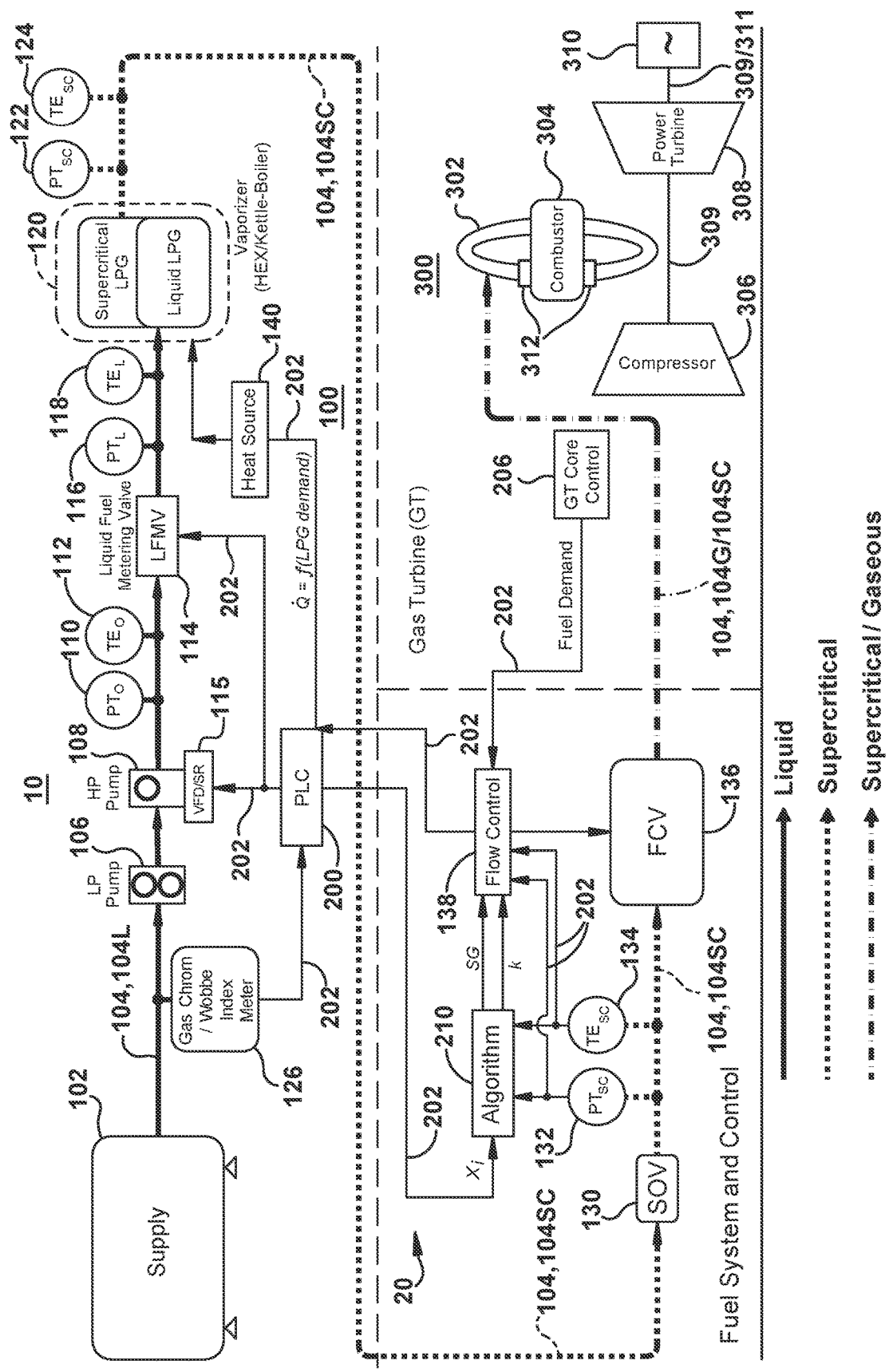
FIG. 1 shows a block schematic diagram of a fuel conditioning and control system according to embodiments of the disclosure.

As an initial matter, in order to clearly describe the current technology, it will become necessary to select certain terminology when referring to and describing relevant machine components within a fuel conditioning and control system for a power plant. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the fuel to a turbine engine or through one of the turbine's component systems. The term "downstream" corresponds to the direction of flow of the fluid, and the term "upstream" refers to the direction opposite to the flow.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

With reference to the Figures, FIG. 1 shows a fuel conditioning system and control system 10 according to embodiments of the disclosure. Fuel conditioning system and control system 10 includes a fuel delivery sub-system 100, a fuel and control system 20 including programmable logic controller (PLC) 200, and turbomachinery, including a gas turbine engine 300 (hereinafter "gas turbine").

In fuel conditioning system and control system 10, liquid LPG is first converted or conditioned to a supercritical LPG, and then could either remain in such phase or be converted or conditioned to gaseous LPG based on operational conditions and demands of the fuel conditioning system and controls system 10. Supercritical LPG is delivered downstream to gas turbine 300 via fuel delivery subsystem 100. LPG fuel downstream flow through conditioning system and control system 10 is controlled by fuel and control system 20.

Fuel delivery sub-system 100 includes a storage tank 102 for liquefied petroleum gas (LPG). A series of conduits 104, 104L (for liquid fuel), 104SC (for supercritical fuel), 104G (for gaseous fuel) interconnect elements of the fuel delivery subsystem 100 and connect storage tank 102 to gas turbine 300, as described herein. In terms of fuel delivery subsystem 100, LPG flow is from the most upstream component of fuel delivery subsystem 100 storage tank 102 downstream to the end of the fuel delivery subsystem 100, at gas turbine 300.

Conduit 104L connects storage tank 102 to a low-pressure pump 106 and a high-pressure pump 108. Low-pressure pump 106 and high-pressure pump 108 help to withdraw liquid LPG from storage tank 102 and move liquid LPG fuel through conduit 104L. Further, low-pressure pump 106 and high-pressure pump 108 increase the overall pressure on liquid LPG fuel from storage tank 102 as liquid LPG fuel flows downstream along conduit 104L.

Also, as liquid LPG fuel is withdrawn from storage tank 102, liquid LPG fuel flow moves downstream where LPG fuel has various properties measured by at least one fuel property definition instrument, such as, but not limited to, a gas chromatograph or a gas calorimeter (such as a Wobbe index meter), or a mass spectrometer with chromatography capabilities (GC/WIM) 126. At GC/WIM 126, properties of liquid LPG fuel are provided to programmable logic control (PLC) 200 of fuel and control system 20. The fuel composition definition component of GC/WIM 126 functions to determine component constituents of the liquid LPG fuel, including but not limited to, qualitative and quantitative hydrocarbon composition aspects, such as but not limited to heating values, relative density, vapor pressure, and motor octane number. The calorimeter or Wobbe Index component of GC/WIM 126 measures of the interchangeability of liquid LPG fuel gases, heating specifics of the liquid LPG fuel, and liquid LPG fuel's relative ability to deliver energy. The measurements from GC/WIM 126 are fed to PLC 200 along signal paths 202. Signal paths 202 can be any form of transmission of signals from GC/WIM 126 (or any device of the embodiments of the disclosure that provide data). Signal paths 202 provide data and information/commands to and from elements that are connected to fuel and control system 20.

The fuel delivery sub-system 100 also includes an electric motor speed variation device, such as, but not limited to, a variable frequency driver (VFD) or a Switched Reluctance (SR) motor (VFD/SR) 115 that is connected to high-pressure pump 108. VFD/SR 115 controls operation of at least high-pressure pump 108. In certain aspects of the embodiments, VFD/SR 115 can control both low-pressure pump 106 and high-pressure pump 108. VFD/SR 115 controls operation of at least high-pressure pump 108 in response to signals from PLC 200 along signal paths 202, as described herein. VFD/SR 115 controls operation of at least high-pressure pump 108 to increase pressure of the liquid LPG fuel downstream flow in conduit 104L after liquid LPG fuel flows from high-pressure pump 108 to pressure sensor 110 $PT_O$ and temperature sensor 112 $TE_O$ (the subscript "0" connotes "original" liquid LPG Fuel from the storage tank 102).

From pump 106 and high-pressure pump 108, fuel delivery sub-system 100 further includes liquid LPG fuel flowing downstream in conduit 104L that extends past a series of sensors, pressure sensor 110 $PT_O$ and temperature sensor 112 $TE_O$ Pressure sensor 110 $PT_O$ and temperature sensor 112 $TE_O$ take measures of the liquid LPG fuel after liquid LPG fuel flows past pumps 106, 108. Each sensor, pressure sensor 110 $PT_O$ and temperature sensor 112 $TE_O$, provides liquid LPG property information and feedback to fuel and control system 20 and PLC 200 along signal paths 202 (for ease of description, illustration, and understanding, not all paths 202 are shown). Thus, flow of liquid LPG fuel through fuel conditioning system and control system 10 is managed and controlled. Both pressure sensor 110 $PT_O$ and temperature sensor 112 $TE_O$ include embedded transmitter enabled components that enable liquid LPG property information and feedback to be sent to fuel and control system 20 and PLC 200 along signal paths 202.

From low-pressure pump 106 and high-pressure pump 108, fuel conduit 104L leads the liquid LPG flow downstream to liquid fuel metering value (LFMV) 114. LFMV 114 is controlled by programmable logic controller (PLC) 200 to permit liquid LPG fuel to flow therethrough in amounts that enable the liquid LPG fuel to be converted to supercritical LPG fuel in vaporizer/heat exchanger 120, as described herein. LFMV 114 meters liquid LPG fuel flow downstream and enables stable control of the flow rates. LFMV 114 can include any configuration of a metering valve now known or hereinafter developed that enables metering of liquid LPG fuel flow and stable control of the flow rates of liquid LPG fuel downstream along conduit 104L.

From LFMV 114, in fuel delivery sub-system 100, liquid LPG fuel flows downstream along conduit 104L and passes pressure sensor 116 $PT_L$ and temperature sensor 118 $TE_L$, where "L" connotes "liquid" for the liquid LPG fuel. As with pressure sensor 110 $PT_O$ and temperature sensor 112 $TE_O$, pressure sensor 116 $PT_L$ and temperature sensor 118 $TE_L$ provide liquid LPG property information and feedback to fuel and control system 20 and PLC 200 along signal paths 202. Thus, downstream flow of liquid LPG fuel through the fuel conditioning system and control system 10 and fuel delivery sub-system 100 is managed and controlled. Both pressure sensor 116 $PT_L$ and temperature sensor 118 $TE_L$ include an embedded transmitter enabled components that enable liquid LPG fuel property information and feedback to fuel and control system 20 and PLC 200 along signal paths 202.

Conduit 104L leads downstream to reactor or vaporizer/heat exchanger 120 in fuel delivery sub-system 100. In accordance with the embodiments of the disclosure, vaporizer/heat exchanger 120 of fuel delivery sub-system 100 can include known or hereinafter developed vaporizer/heat exchanger 120 configurations. Known or hereinafter developed vaporizer/heat exchanger 120 configurations in accordance with the embodiments include at least rigid non-expandable walls that are sufficiently rigorous to withstand elevated pressures therein. Vaporizer/heat exchanger 120 configurations in fuel delivery sub-system 100, in accordance with aspects of the embodiments, enable contents of vaporizer/heat exchanger 120 to have heat applied thereto. Heat can be applied within vaporizer/heat exchanger 120 or external to vaporizer/heat exchanger 120 and transmitted through walls via normal thermal dynamics. The source 140 of this applied heat can be obtained from, but not limited to, an electrical source such as (but not limited to) electrical resistances or heat tracing loops; this heating source 140 can obtain the energy from an externally induced, high temperature fluid flow such as, but not limited to, oil, or water vapor (steam).

In vaporizer/heat exchanger 120, heat is applied to the liquid LPG fuel in the non-expanding confinement of vaporizer/heat exchanger 120 walls. When under increased temperatures with no expansion, under basic thermodynamic principles, the liquid LPG fuel is put under specific conditions of pressure and temperature where a critical point for the liquid LPG fuel is attained. When the liquid LPG fuel is subjected to a pressure and a temperature higher than its critical point, the liquid LPG fuel is then "supercritical." LPG fuel is "supercritical" when it is heated above its critical temperature and under compression above its critical pressure. In the supercritical region, the LPG fuel is now supercritical LPG fuel that exhibits particular supercritical properties and has an intermediate behavior between that of a liquid and a gas. In particular, supercritical fluids (SCFs) possess properties such as liquid-like densities, gas-like viscosities, and diffusion values intermediate to that of a liquid and a gas.

Additionally, vaporizer/heat exchanger 120 of fuel delivery sub-system 100 is connected to fuel and control system 20 and PLC 200 along signal paths 202, to both receive and send information. Vaporizer/heat exchanger 120 sends information, such as vaporizer/heat exchanger 120 temperature and pressure to fuel and control system 20 and PLC 200 along signal paths 202 to assist in the fuel and control system 20 and PLC 200 control of vaporizer/heat exchanger 120 and all of conditioning system and control system 10. In particular, vaporizer/heat exchanger 120 provides information to fuel and control system 20 and PLC 200 for control and operational parameters to at least one of VFD 115 and LFMV 114. Additionally, vaporizer/heat exchanger provides information to PLC 200 to control the amount of heat applied to the liquid LPG to convert it to supercritical LPG, by adjusting the demand of heat incoming from the heating source 140 depending on its operational principle. This could be, but not limited to, adjusting the electrical current through electrical resistances or heat tracings, adjusting the flow of the incoming, high temperature fluid such as, but not limited to, steam, or oil.

From vaporizer/heat exchanger 120 in fuel delivery sub-system 100, the now supercritical LPG fuel exits in conduit 104SC. Supercritical LPG fuel then flows downstream to another set of sensors, pressure sensor 122 $PT_{SC}$ and temperature sensor 124 $TE_{SC}$ (where "SC" is for supercritical). As with the above sets of sensors, pressure sensor 122 $PT_{SC}$ and temperature sensor 124 $TE_{SC}$ provide LPG fuel property information and feedback to fuel and control system 20 and PLC 200 along signal paths 202. However, at this position in fuel conditioning system and control system 10 after vaporizer/heat exchanger 120, pressure sensor 122 $PT_{SC}$ and temperature sensor 124 $TE_{SC}$ provide supercritical LPG fuel property information and feedback to fuel and control system 20 and PLC 200 along signal paths 202. Thus, flow of liquid LPG fuel through fuel conditioning system and control system 10 including fuel delivery sub-system 100 is managed and controlled both by pressure sensor 122 $PT_{SC}$ and temperature sensor 124 $TE_{SC}$, which also include embedded transmitter enabled components that enable supercritical LPG fuel property information and feedback to fuel and control system 20 and PLC 200 along signal paths 202, for control of fuel conditioning system and control system 10 and fuel delivery sub-system 100 as described here.

Supercritical LPG fuel flows downstream through conduit 104SC of fuel delivery sub-system 100 where at least one shut off value (SOV) 130 is positioned in fuel and control system 20. SOV 130 permits flow of supercritical LPG fuel to be halted after supercritical LPG fuel is created. In one aspect of the embodiments, SOV 130 permits flow of supercritical LPG fuel to be halted manually by actuating SOV 130. Alternately, SOV 130 permits flow of supercritical LPG fuel to be halted via signals from fuel and control system 20 when any condition sensed in conditioning system and control system 10 is abnormal by any of the series of sensors: pressure sensor 110 $PT_O$ and temperature sensor 112 $TE_O$, pressure sensor 116 $PT_L$ and temperature sensor 118 $TE_L$; pressure sensor 122 $PT_{SC}$ and temperature sensor 124 $TE_{SC}$; and/or pressure sensor 132 $PT_{SC}$ and temperature sensor 134 $TE_{SC}$ (to be described hereinafter). Also, in addition or alternatively, SOV 130 permits flow of supercritical LPG fuel in fuel and control system 20 to be halted via signals from fuel and control system 20. In accordance with certain aspects of the embodiments, halting of LPG fuel can be because of any abnormal condition sensed at any fuel delivery sub-system 100 position by elements connected to PLC 200 of fuel and control system 20, including but not limited to, GC/WIM 126, VFD/SR 115, LFMV 114, vaporizer/heat exchanger 120, and/or heating source 140. In addition, SOV 130 permits flow of supercritical LPG fuel in fuel and control system 20 to be halted via signals from control system 20 because of abnormal conditions sensed at any condition by gas turbine (GT) sub-system 300 via the GT Core Control 206 (to be described hereinafter). Furthermore, there could be multiple SOV 130 components in fuel and control system 20 if required and justified by operational or safety related conditions.

As supercritical LPG fuel flows downstream past SOV 130 in fuel and control system 20, supercritical LPG fuel then flows past another series of sensors, pressure sensor 132 $PT_{SC}$ and temperature sensor 134 $TE_{SC}$ (where "SC" is for supercritical). As with other sensors according to aspects of the disclosure, each of pressure sensor 132 $PT_{SC}$ and temperature sensor 134 $TE_{SC}$ is connected via signal lines 202 to fuel and control system 20. Each of pressure sensor 132 $PT_{SC}$ and temperature sensor 134 $TE_{SC}$ provides LPG fuel property information and feedback to fuel and control system 20 and PLC 200 along signal paths 202, and enable fuel and control system 20 to properly define and manage flow of LPG fuel in its liquid, gaseous, and/or supercritical states through the fuel conditioning system and control system 10, as described herein.

After the supercritical LPG fuel passes the series of sensors, pressure sensor 132 $PT_{SC}$ and temperature sensor 134 $TE_{SC}$, the supercritical LPG fuel in conduit 104SC flows downstream to fuel control valve (FCV) 136 of fuel and control system 20. FCV 136 permits controlled flow of the supercritical LPG fuel in appropriate rates as determined by fuel and control system 20 when provided with input from fuel conditioning system and control system 10 components, as discussed herein. At FCV 136 of fuel delivery sub-system 100, FCV 136 permits fuel to pass therethrough in accordance with a fuel demand needed by the gas turbine 300 to operate under sensed operational conditions. The fuel demand needed by the gas turbine 300 to operate under sensed operational conditions is provided by gas turbine core control 206.

Further details of gas turbine core control 206 and gas turbine core control 206 sensed conditions will follow. For ease of understanding, gas turbine core control 206 senses conditions in gas turbine 300 including, but not limited to, compressor 306 discharge pressure, compressor 306 speed, combustor 304 firing conditions, low-pressure turbine pressure, combustor 304 pressure, gas turbine speed, load 310 demand, power turbine 308 temperatures and pressures, and other such gas turbine 300 operational variables now known or hereinafter determined. The sensed conditions provided by characteristics of gas turbine 300 sensed by gas turbine core control 206 are provided to flow control module 138 of fuel and control system 20. In fuel and control system 20, sensed conditions are provided by characteristics of gas turbine 300 sensed by gas turbine core control 206 are analyzed and evaluated by algorithm 210 (along with supercritical pressure and temperatures given by PT 132$_{SC}$ and TE 134$_{SC}$, respectively, as well as LPG fuel composition as measured and defined by GC/WIM 126). Feedback can be provided to components of fuel delivery sub-system 100 for enhanced and dynamic operation, including dynamic operation based on real-time data. As used herein, dynamic operation includes operational modifications is needed by fuel and control system 20 analyzing and evaluating real-time data. In certain aspects of the embodiments, components of fuel delivery sub-system 100 to which feedback can be provided for enhanced and dynamic operation, include but are not limited to, low-pressure pump 106 and high-pressure pump 108, LFMV 114, vaporizer/heat exchanger 120, data from vaporizer/heat exchanger 120, heating source 140, data from heating source 140, and FCV 136.

At FCV 136 of fuel and control system 20, the flow of supercritical LPG fuel is throttled to meet the LPG fuel demand downstream to GT 300 in conduit 104G/104SC (here "G" is for gaseous, and "SC" is for supercritical); this fuel could either be in gas phase, or supercritical phase depending on operational conditions from GT 300. Gaseous/supercritical LPG fuel is fed from conduit 104/104G/104SC to gas manifold 302 of gas turbine 300. At gas manifold 302, the gaseous/supercritical LPG fuel is distributed among all the fuel nozzles/premixers 312. In some instances, the gaseous/supercritical LPG fuel combines inside the fuel nozzles/premixers with compressed fluid (generally air) from the compressor 306 prior to enter into the combustor 304. In some instances, the gaseous/supercritical LPG fuel combines with compressed fluid (generally air) from the compressor 306 at the combustor 304. The gaseous/supercritical LPG fuel and compressed air are then ignited in combustor 304. From combustor 304, the now ignited and expanded gaseous/supercritical LPG fuel is directed to (gas) power turbine 308 where rotational movement of the gas power turbine 308 is transferred to the rotor or shaft 309/311. Rotor or shaft 309 is mechanically connected from gas power turbine 308 to compressor 306 to rotate compressor 306. In some instances, rotor or shaft 309 can be independent from the rotor or shaft 309/311 to be connected to load 310, which is driven by the rotation of rotor or shaft 309/311. Furthermore, 309/311 could represent multiple shafts, all capable to rotate at different speeds, depending on the design and principle of operation of the gas turbine (GT) 300. Load 310 can be any appropriate load, such as but not limited to a generator, pump, another turbine, machine, or any other load now know or hereinafter developed.

Figure 2:
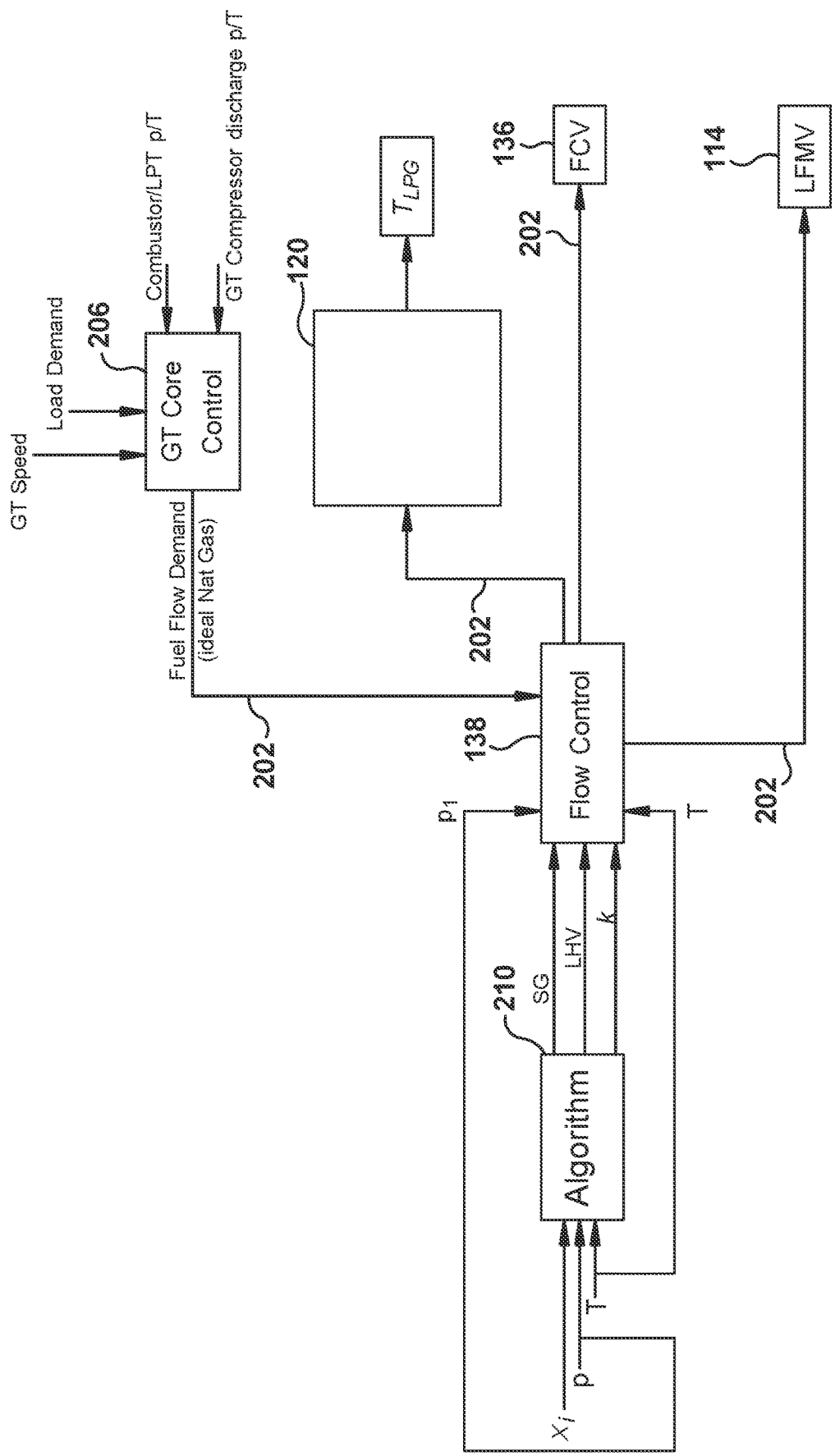
FIG. 2 shows a block schematic diagram of the control schema for a fuel conditioning and control system as embodied by the disclosure.

With respect to FIGS. 1 and 2, fuel and control system 20 and its interactions with components of fuel conditioning system and control system 10 and fuel delivery sub-system 100 will now be described. As described, fuel and control system 20 includes PLC 200. PLC 200 is connected to multiple elements of fuel conditioning system and control system 10 including, but not limited to: series of sensors—pressure sensor 110 $PT_O$ and temperature sensor 112 $TE_O$, pressure sensor 116 $PT_L$ and temperature sensor 118 $TE_L$; pressure sensor 122 $PT_{SC}$ and temperature sensor 124 $TE_{SC}$; and/or pressure sensor 132 $PT_{SC}$ and temperature sensor 134 $TE_{SC}$; GC/WIM 126; VFD/SR 115 and through VFD/SR 115 low-pressure pump 106 and high-pressure pump 108; LFMV 114; vaporizer/heat exchanger 120; heating source 140; SOV 130, FCV 136 and gas turbine 300 through gas turbine core control 206. As noted above, signal paths 202 interconnect elements noted above and components of fuel and control system 20 and fuel conditioning system and control system 10.

Fuel and control system 20 includes PLC 200. PLC 200 is a programmable logic control, which has configured for use control of fuel conditioning system and control system 10. In one aspect of the embodiments, PLC 200 can include a small modular device with limited inputs and outputs (I/O). In other aspects of the embodiments, PLC 200 can include a large device, and in other aspects, PLC 200 can be networked to other PLCs and other systems of a power plant that incorporates a fuel conditioning system and control system 10. PLC 200 provides a flexible, rugged, and straightforward controller, with high-reliability automation in harsh environments of a power plant. In aspects of the embodiments, PLC 200 and can be any now known PLC or hereinafter developed PLC.

Fuel and control system 20 includes flow control module 138. Flow control module 138 is connected to FCV 136, and receives data from algorithm 210, as discussed herein. Flow control module 138 is connected to FCV 136 to control the positioning of FCV 136 to flow supercritical LPG fuel downstream in fuel conditioning system and control system 10 in appropriate rates as designated by fuel and control system 20 when provided with input from fuel conditioning system and control system 10 components. In particular, FCV 136 permits fuel to pass therethrough as a fuel demand determined by gas turbine core control 206 determines fuel demand needed by the gas turbine 300 to operate under sensed conditions.

Flow control module 138 receives input from various components of fuel delivery sub-system 100 in fuel conditioning system and control system 10. Flow control module 138 is connected to algorithm 210 that is a component of fuel and control system 20. As illustrated in FIG. 2, algorithm 210 receives signals and data on the fuel composition $x_i$ data from PLC 200 where fuel composition $x_i$ data originates from the GC/WIM 126. Further, algorithm 210 receives pressure p and temperature T signals and data from the series of sensors: pressure sensor 110 $PT_O$ and temperature sensor 112 $TE_O$, pressure sensor 116 $PT_L$ and temperature sensor 118 $TE_L$; pressure sensor 122 $PT_{SC}$ and temperature sensor 124 $TE_{SC}$; and/or pressure sensor 132 $PT_{SC}$ and temperature sensor 134 $TE_{SC}$. The pressure p and temperature T signals and data from the series of sensors can be used by algorithm 210 as needed for system control purposes.

Algorithm 210 provides an output of estimated values of specific gravity SG, specific heat ratio k and lower heating value LHV. The specific gravity SG and specific heat ratio k are provided to flow control module 138. Flow control module 138 is also provided with pressure $p_1$ given by PT 132$_{SC}$ or, for the purposes of this disclosure, could be given separately by any additional pressure sensor dedicated to feed the flow control 138 with this value. This pressure $p_1$ represents the inlet pressure to FCV 136; and is used to define the position of the valve, along with the specific gravity SG, specific heat ratio k, gas fuel temperature T, and a fuel demand from gas turbine core control 206. Thus, flow control module 138 of fuel and control system 20 in conjunction with PLC 200 of fuel conditioning system and control system 10 can determine LFMV 114 of fuel delivery sub-system 100 positioning for the fuel demand needed by gas turbine 300, where fuel demand needed by gas turbine 300 is provided to flow control module 138 of fuel and control system 20 and PLC 200 of fuel conditioning system and control system 10 from gas turbine core control 206. Moreover, flow control module 138 of fuel and control system 20 in conjunction with PLC 200 of fuel conditioning system and control system 10 can determine FCV 136 positioning for the fuel demand needed by gas turbine 300 in terms of supercritical conditions encountered at FCV 136, where fuel demand needed by gas turbine 300 is provided to flow control module 138 of fuel and control system 20 from gas turbine core control 206.

Further, in accordance with other aspects of the embodiments, fuel and control system 20 with flow control module 138 in conjunction with PLC 200 and algorithm 210 can determine a preferred temperature or heat "Q" to apply to vaporizer/heat exchanger 120 from the heating source 140. Applying a determined preferred temperature or heat "Q" to vaporizer/heat exchanger 120 from heating source 140 may enable vaporizer/heat exchanger 120 to function at high levels of efficiency to convert the liquid LPG fuel to supercritical LPG fuel at the required temperature. The preferred temperature or heat "Q" applied to vaporizer/heat exchanger 120 from heating source 140 may be determined as a function "f" of process variables, such as but not limited to temperature, pressure, and LPG flow demand. In other words, Q=F(LPG demand). Moreover, temperature or heat "Q" applied to vaporizer/heat exchanger 120 may be determined as a function of one or more of standard fuel property characteristics, including but not limited to specific volume v, specific heat $c_p$, absolute viscosity η, thermal conductivity λ and specific enthalpy h, critical temperature $T_c$, and/or critical pressure, $p_c$. Furthermore, temperature or heat "Q" may be determined based on the principle of operation of heating source 140 as a function of one or more operability variables, including but not limited to electric resistance in the case of electrical heaters, or heat conduction and convection parameters of incoming, high temperature fluids such as steam or oil.

Further, data can be utilized by fuel and control 20 to determine desired real-time operational conditions of fuel delivery sub-system 100 and its components. With the real-time data defining real-time operational conditions for the overall fuel conditioning system and control system 10, as well as for fuel delivery sub-system 100, FCV 136 can be set to a desired position in accordance with the instantaneous and real time values using sensed fuel pressure, temperature and composition, including those values at the inlet of FCV 136 to set desired FCV 136 position. The desired position of FCV 136 permits supercritical LPG to pass therethrough in appropriate amounts to operation gas turbine 300 in dynamic and steady state conditions.

Accordingly, embodiments of the disclosure provide a fuel conditioning system and control system 10, a fuel and control system 20, and an associated method to operate gas turbines with LPG fuels in supercritical phase. The embodiments include fuel and control systems 20 and associated algorithm 210 enabled software with supercritical LPG properties that provide the embodiments with dynamic gas turbine fuel control. Further, managing flow in fuel conditioning system and control system 10 as set forth herein can lead to enhanced durability of fuel conditioning system and control system 10 and fuel delivery sub-system 100 components handling supercritical LPG fuel. Additionally, instrumentation, such as a gas chromatograph and calorimeter (such as a Wobbe index meter WIM), that are able to evaluate thermodynamic fuel properties and LPG composition, further enables fuel conditioning system and control system 10, as well as fuel delivery sub-system 100, to dynamically adjust in real time fuel flow automatically during gas turbine 300 operation.

As embodied by the disclosure, fuel conditioning system and control system 10 provides robustness to gas turbine operations by adding real time data, including but not limited to, accurate values of the LPG densities, specific heat ratios, superheat requirements, and mass diffusion ranges in liquid, gas, and supercritical phases. This real-time data can avoid trips caused by fuel property differences and accordingly, fluctuations in operation. Moreover, fuel conditioning system and control system 10 can provide gas turbine 300 operations with a variety of LPG fuel compositions, including but not limited LPG fuel that includes at least one of methane, ethane, hexane, pentane, propane, and butane In the embodiments, fuel conditioning system and control system 10 transports liquid LPG fuel downstream from storage or storage tank 102 to gas turbine 300, while converting the liquid LPG fuel from a liquid state to a supercritical state. The flow of LPG fuel is in fuel delivery sub-system 100 and controlled by fuel and control system 20. From storage tank 102 the liquid LPG fuel flow in conduit 104L with low-pressure pump 106 and high-pressure pump 108 providing motive force to the liquid LPG fuel. As noted, VFD/SR 115 drives high-pressure pump 108. VFD/SR 115 drives high-pressure pump 108 through signals from fuel and control system 20. GC/WIM 126 obtains constituent information of liquid LPG fuel including interchangeability of liquid LPG fuel gases, heating specifics of the liquid LPG fuel and liquid LPG fuel's relative ability to deliver energy before the liquid LPG fuel is moved through low-pressure pump 106 and high-pressure pump 108. After low-pressure pump 106 and high-pressure pump 108, the liquid LPG fuel flows downstream to a first set of sensors, pressure sensor 110 $PT_0$ and temperature sensor 112 $TE_0$. The flow of liquid LPG fuel then is metered and controlled by LFMV 114 that permits downstream flow as determined by fuel and control system 20. After LFMV 114, the liquid LPG fuel has its pressure and temperature sensed by another set of sensors, pressure sensor 116 $PT_L$ and temperature sensor 118 $TE_L$. The liquid LPG fuel then enters reactor or vaporizer/heat exchanger 120. In vaporizer/heat exchanger 120, heat is applied to vaporizer/heat exchanger 120 by heating source 140 to heat the liquid LPG fuel to supercritical LPG fuel. The then supercritical LPG fuel flows downstream and again has its pressure and temperature sensed by pressure sensor 122 $PT_{SC}$ and temperature sensor 124 $TE_{SC}$ that provide supercritical LPG fuel thermodynamic property information and feedback to fuel and control system 20.

The supercritical LPG fuel next flows in conduit 104SC to SOV 130. After SOV 130 the pressure and temperature of the supercritical LPG fuel is again sensed by pressure sensor 132 $PT_{SC}$ and temperature sensor 134 $TE_{SC}$ and provide supercritical LPG fuel thermodynamic property information and feedback to fuel and control system 20 and PLC 200 along signal paths 202, and enable fuel and control system 20 to manage flow of supercritical LPG fuel in its liquid, gaseous, and/or supercritical states through the fuel conditioning system and control system 10. After pressure sensor 132 $PT_{SC}$ and temperature sensor 134 $TE_{SC}$ the supercritical LPG fuel is then fed through FCV 136 in fuel demand amounts determined and controlled by fuel and control system 20. Flow control module 138 can be based on gas turbine core control 206 information about gas turbine 300 and its component's operational characteristics.

Fuel conditioning system and control system 10 in conjunction with fuel and control system 20 and gas turbine 300 operational information and fuel demand enable the overall fuel conditioning system and control system 10 to provide real-time and dynamic control and conditioning of liquid LPG fuel to supercritical LPG fuel. Accordingly, FCV 136 can be set to a desired position in accordance with the instantaneous, dynamic, and real time values using at least one of sensed fuel pressure, temperature, and composition characteristics, including those values at FCV 136 to set desired FCV 136 position meeting fuel demand of gas turbine 300. The desired position of FCV 136 permits supercritical LPG to pass therethrough in appropriate amounts to operation gas turbine 300 in dynamic and steady state conditions.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A fuel conditioning and control system for dynamic control and steady state operations of a gas turbine provided with liquefied petroleum gas (LPG), the fuel conditioning and control system comprising:
   a fuel delivery sub-system including a storage for LPG fuel and a conduit connecting the storage to the gas turbine;
   the fuel delivery sub-system further including a heating source connected to a heat exchanger to convert liquid LPG fuel to supercritical LPG fuel;
   a fuel and control system including a programmable logic control (PLC), an algorithm, and a flow control module;
   the gas turbine including a gas turbine core control that provides at least one operational condition of the gas turbine to the fuel and control system; and
   the fuel delivery sub-system includes at least one sensor for sensing at least one property of the LPG fuel in the fuel delivery sub-system, the at least one sensor configured to provide data on the at least one property of the LPG fuel in the fuel delivery sub-system to the fuel and control system;
   wherein the fuel and control system analyzes the data on the at least one property of the LPG fuel and the at least one operational condition of the gas turbine to control flow of LPG fuel to the gas turbine under dynamic and steady state conditions, and wherein the fuel and control system controls the heating source to control conversion of the liquid LPG fuel from liquid LPG fuel to the supercritical LPG fuel in the heat exchanger by the fuel and control system in response to a fuel demand of the gas turbine for dynamic and steady state operations of the gas turbine and based on the data on the at least one property of the LPG fuel.

2. The fuel conditioning and control system according to claim 1, wherein the at least one sensor for sensing the at least one property of the LPG fuel in the fuel delivery sub-system includes at least one pressure sensor and at least one temperature sensor.

3. The fuel conditioning and control system according to claim 1, wherein the at least one sensor for sensing the at least one property of the LPG fuel in the fuel delivery sub-system includes a plurality of pressure sensors and a plurality of temperature sensors.

4. The fuel conditioning and control system according to claim 1, wherein the at least one sensor for sensing the at least one property of the LPG fuel in the fuel delivery sub-system includes at least one of a gas chromatograph and a calorimeter.

5. The fuel conditioning and control system according to claim 1, wherein the fuel delivery sub-system includes a low-pressure pump and a high-pressure pump in series, the low-pressure pump and the high-pressure pump in series increasing downstream pressure of the LPG fuel in the fuel delivery sub-system.

6. The fuel conditioning and control system according to claim 5, wherein the fuel delivery sub-system further including at least one of a variable frequency drive (VFD) and a switched reluctance (SR) motor, the at least one of the VFD and the SR being connected to at least the high-pressure pump, the PLC and the at least one of the VFD and the SR connected to the PLC, the PLC configured to provide operating instructions to the at least one of the VFD and the SR for controlling operations of at least the high-pressure pump.

7. The fuel conditioning and control system according to claim 1, wherein the fuel delivery sub-system further includes a liquid fuel metering valve (LFMV), the LFMV being connected to the PLC, the PLC configured to provide operating instructions to the LFMV for controlling flow of liquid LPG fuel downstream along the fuel delivery sub-system.

8. The fuel conditioning and control system according to claim 1, wherein the gas turbine includes a compressor and a combustor; the gas turbine being connected to a load;
   wherein the gas turbine core control senses the at least one operational condition of the gas turbine, the at least one operational condition including at least one of compressor discharge pressure, combustor firing temperature, combustor pressure, gas turbine speed, load demand, gas turbine temperatures, and gas turbine pressures.

* * * * *